MULTIREMANENCE FERROELECTRIC CERAMIC MEMORY ELEMENT

INVENTORS
Cecil E. Land
Gene H. Haertling
BY
Roland A. Anderson
Attorney

INVENTORS
Cecil E. Land
Gene H. Haertling
BY
Roland A. Anderson
Attorney

United States Patent Office 3,434,122

Patented Mar. 18, 1969

3,434,122
MULTIREMANENCE FERROELECTRIC CERAMIC MEMORY ELEMENT

Cecil E. Land and Gene H. Haertling, Albuquerque, N. Mex., assignors to the United States of America as represented by the United States Atomic Energy Commission Filed Mar. 13, 1964, Ser. No. 351,875
U.S. Cl. 340—173.2 8 Claims
Int. Cl. G11b 9/02; C04b 35/24

ABSTRACT OF THE DISCLOSURE

A single phase rhombohedral ferroelectric ceramic composition having a plurality of stable, repeatable and detectable polarization states above zero polarization comprising a solid solution of lead zirconate-lead titanate in the mole ratios between 60:40 and 80:20 including a 0.1 to 4 atom percent additive of an element in oxidic form selected from the group consisting of niobium, tantalum, bismuth and antimony, the composition being formed by hot pressing at a temperature between 1250 and 1350° C. at a pressure of at least 1500 p.s.i. for a time of at least one hour, and providing a multiremanence memory element having a 2-terminal resonator constructed of the ferroelectric composition.

This invention relates broadly to the production of improved ferroelectric ceramic compositions consisting mainly of solid solutions of lead zirconate and lead titanate modified by the addition of certain oxides to be described hereafter to achieve improved material characteristics uniquely adapted to the construction of multistate memory elements in computer logic circuits and of variable rectance elements in various types of electronic systems. The invention encompasses not only the improved compositions and their adaptations but also the particular means by which such compositions are produced or manufactured.

Ferroelectric ceramic memory elements and arrays thereof present several significant advantages over ferroelectric memory devices presently in use or contemplated. It has been known for some time that the physical and electrical properties of ferroelectric ceramics in general are relatively insensitive to high energy particle irradiation and high intensity electromagnetic fields. This is a definite advantage for applications in space and other radiation environments. Ferroelectric ceramics are especially applicable to the use of printed circuit techniques in the fabrication of memory arrays.

The use of ferroelectric elements for computer logic and memory application has, however, been hampered by the fact that such elements are inherently bistable or biremanence devices. They are able to store information in only two states, namely, the two saturation remanence conditions at opposite ends of the polarization axis. Such elements are further disadvantaged in that the mechanism of "readout" or interrogation of such memory elements has generally been regarded as involving the destruction of the existing polarization states.

The inventors of the present composition have appreciated that a great contribution could be made to the versatility and efficiency of logic systems if the existing biremanence ferroelectric compositions could be improved or modified to enable them to store information in any one of a large number, say ten to one hundred, of stable, distinguishable, incremental polarization states, and further if such polarization states could be made sensitive to a continuous, nondestructive, small-signal readout stimulus, without the need for "write-back" or restoring circuitry. Memory elements having such multistate capability would eliminate the need for binary to decimal conversion circuitry, thereby increasing storage capacity per unit volume together with increased reliability.

It is therefore a fundamental object of this invention to provide novel ferroelectric ceramic compositions characterized by a plurality of distinguishable, stable, incremental polarization states.

It is a more specific object of this invention to provide improved multiremanence ferroelectric ceramic compositions which are adapted to function as memory elements wherein the incremental polarization states can be continuously and nondestructively interrogated.

A further disadvantage of existing ferroelectric ceramics made in accordance wiht normal sintering techniques (i.e., at atmospheric pressure) is the lack of rectangularity in the hysteresis loop. This lack of rectangularity is thought to be caused by non-uniform internal field distribution arising from the normal porosity of the material. This non-uniformity of the internal field results in a relatively wide range of switching thresholds for both easy (180°) and hard, strain producing (less than 180°) domain switching. Because of the wide range of such switching thresholds, the domain switching sequences vary for successive switching cycles. Thus the immittance (i.e., admittance of impedance)-polarization relationship changes considerably for successive switching cycles. This renders such normally sintered materials completely unsatisfactory for use as multiremanence memory devices. This follows since, in order to function successfully in this capacity the immittance-polarization response to a small-signal readout stimulus must remain invariant as the polarization is switched through successive information storage cycles. It has not been realized heretofore that any useful relationship of this type exists in a ferroelectric ceramic, hence no attempt has been made to investigate means for rendering it more effective.

It is therefore yet another object of this invention to produce an improved multiremanence ferroelectric composition having a substantially rectangular hysteresis loop such that the immittance-polarization response over successive information storage switching cycles is invariant.

These and further objects of this invention are accomplished by the production of improved ferroelectric ceramic compositions according to the present invention comprising a base of lead zirconate, lead titanate in solid solution together with the addition of from .1 to 4-atom percent of an element in oxidic form selected from the group consisting of Ta, Bi, Nb, and Sb, said composition being produced by a hot-pressing technique with controlled limits of temperature, pressure, and time, as hereinafter described. These ceramic compositions may be formed into two-terminal simple bar or disk resonators, into arrays of two-terminal resonators by allowing small electroded areas of a ceramic sheet to be switched independently, or into multiterminal transmission-type memory elements as described below.

Additional objects of the invention, its advantages and scope, will be more readily apparent from the following description and appended claims taken in conjunction with the attached drawings, in which:

Figure 1:
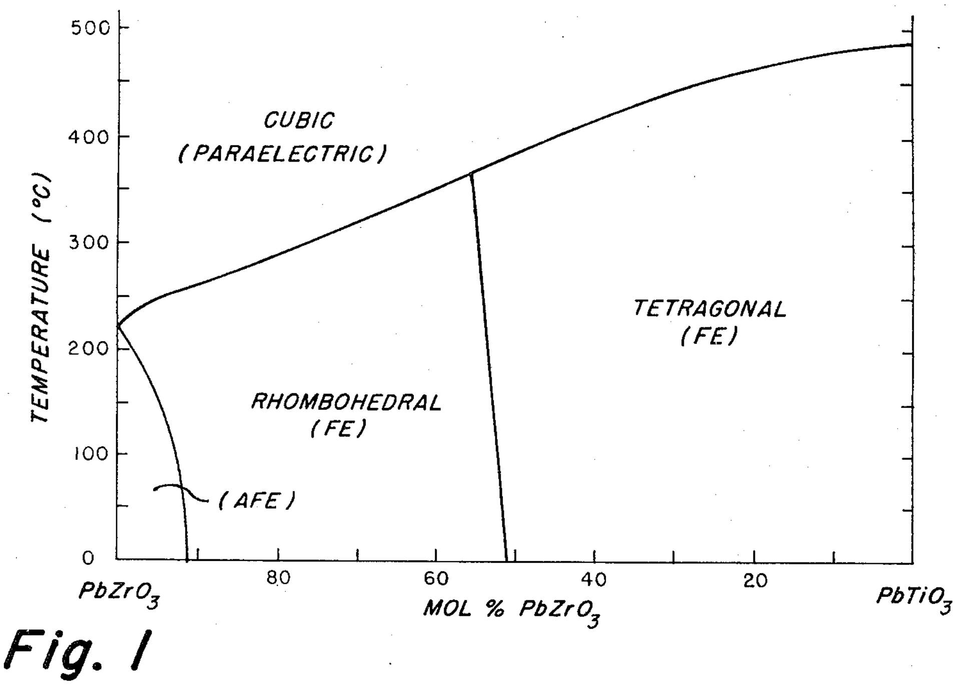
FIG. 1 is a phase diagram for a ferroelectric ceramic composition in accordance with this invention.

With reference now to FIG. 1, there is shown a conventional phase diagram for a lead zirconate-lead titanate ferroelectric composition prepared in accordance with the hot pressing requirements to be discussed containing in this specific case by way of example, 2-atom percent of bismuth as $Bi_2O_3$ for which the general formula may be expressed as follows:

$$Pb_{.99}Bi_{.02}(Zr_xTi_{(1-x)})_{.98}O_3$$

where the parameter defines the relative mol percent of $PbZrO_3$ and $PbTiO_3$. It has been found that in this lead zirconate-titanate solid solution series, compositions near the morphotropic, rhombohedral, tetragonal phase boundary as shown in the diagram exhibit maximum electromechanical coupling factors, which is desirable for memory element application. However, such compositions invariably contain mixed phases which give rise to changes in characteristics after several switching cycles. Compositions near the AFE–FE phase boundary have electromechanical coupling factors less than 0.2 at saturation remanence rendering detection of intermediate polarization states more difficult and readout circuits of relatively higher sensitivity are required. By eliminating compositions near the two phase boundaries and confining the range of the parameter $x$ from 0.60 to 0.80 a range of compositions having rhombohedral symmetry remains which results in acceptable memory element characteristics. In terms of the requirements for a multiremanence memory device optimum characteristics can be achieved at $x=0.65$.

Compositions of the type referenced above have been formed by the inventors by so-called "hot-pressing" techniques. The details of the hot-pressing method of fabrication of ferroelectric ceramics as applied to lead zirconate-titanate compositions in general are set forth in an article entitled "Hot-Pressed Lead Zirconate-Titanate-Stannate Ceramics" by G. H. Haertling in Bull. Am. Ceram. Soc., vol. 42, No. 11, Nov. 7, 1963. The range of the hot-pressing parameters found to be acceptable are temperature 1250° C. to 1350° C., pressure at least 1500 lbs./sq. in. and time at least one hour. In addition to the above, the details of the technique include mixing to a homogeneous blend as a specific example essentially the following percentages by weight: lead oxide (Pbo) 66.65%, zirconium oxide $ZrO_2$ 23.67%, titanium oxide ($TiO_2$) 8.27%, bismuth oxide ($Bi_2O_3$) 1.41%, and calcining the resulting blend for approximately one hour at a temperature of at least 900° C. prior to hot pressing. After hot pressing the composition may optionally be annealed in oxygen atmosphere for at least one hour. It has been found that this step promotes desirable reduction of temperature sensitivity in the small-signal admittance and also improves the rectangularity of the hysteresis loop.

There will be other obvious procedures associated with this technique unnecessary to detail here which will involve no difficulty for those skilled in the art. It will be understood that similar hot-pressing techniques may be employed in preparing other compositions as defined in this specification within the general scope of this invention.

The striking fact to note here is that the use of the hot-pressing technique within the above prescribed parameter limitations achieves material characteristics which are widely divergent from those obtained on similar compositions prepared by normal sintering methods. They are also significantly improved over those obtainable with hot pressing to the extent that such technique has been attempted heretofore. It was found that hot pressing as described increased the bulk density (thus reducing porosity) and increased grain size. Polarization at saturation remanence and planar electromechanical coupling factor were found to be linear functions of bulk density and exponential functions of grain size. Increase in bulk density was accompanied by decreased coercive field and grain boundary volume and increased uniformity of chemical composition, grain size and domain size. All of these factors contribute to increased uniformity of the internal electric field distribution.

The following table illustrates the difference in some important characteristics for a PZT 65/35 mol percent materital containing 2-atom percent bismuth prepared by normal sintering and by hot pressing as above outlined:

TABLE

| Characteristic | Normally sintered | Hot pressed |
|---|---|---|
| Bulk density (gm./cc.) | 7.6 | 7.98 |
| Average grain diameter (microns) | 4±3 | 10±2 |
| Saturation remanence polarization (μ coulombs/cm.$^2$ | 32 | 42 |
| Electromechanical coupling factor, $k_p$ | .4 | .46 |
| Coercive field, $E_c$ (volts/mil) | 25 | 18 |
| Translucency | Low | Medium |

Figure 2:
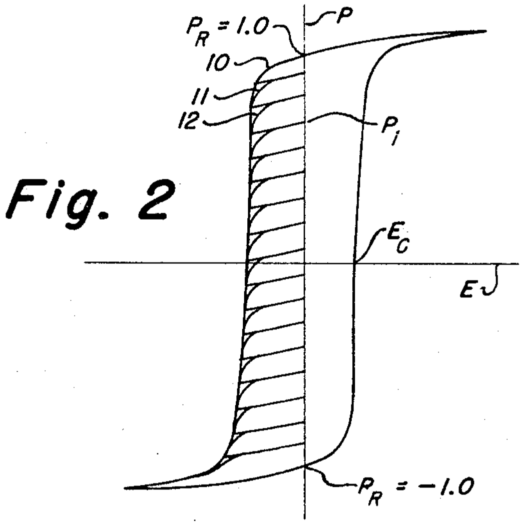
FIG. 2 is a graph illustrating the rectangular hysteresis loop of a ferroelectric ceramic composition in accordance with the invention.

A further confirmation of the predicted characteristics of a composition as described above is observed in FIG. 2 showing a hysteresis loop derived for the general series formulation above wherein the composition $PbZrO_3$ 65 mol percent, $PbTiO_3$ 35 mol percent is employed together with a 2-atom percent additive of oxidic bismuth. This loop is found to be typical of other compositions of lead zirconate-lead titanate prepared within the above detailed limitations by hot pressing and including from .1 to 4-atom percent of an additive from the oxide group consisting of Ta, Bi, Nb, and Sb. It will be observed that a substantially rectangular loop is generated wherein the value of the electric field E is substantially constant at $E_c$ between the values of $P_R=1.0$ and $P_R=-1.0$, where $P_R$ is the saturation remanence. Superimposed on the hysteresis loop are shown a series of polarization increments ranging between the two values of $P_R$. These increments were produced by a series of constant amplitude and duration discrete large signal switching pulses.

By traversing, for example, the switching paths 10, 11, and 12, beginning at $P_R=1.0$, responsive to a like number of switching pulses, the intermediate value of polarization denoted $P_1$ is obtained. Additional switching pulses will yield successive polarization values along the loop of FIG. 2. The diagram illustrates that for the particular switching pulses employed, sixteen separate polarization states were achieved.

The existence of these polarization states can be verified nondestructively by any one of a number of basic readout circuits such as, for example, monitoring admittance modulus $|Y|$ at a frequency in the neighborhood of a fundamental frequency mode. There are other parameters such as the polarization-dependent phase angle $\theta$ of the admittance vector which may be used to monitor polarization state. Still another type of readout circuit may be responsive to changes in both admittance modulus $|Y|$ and phase angle $\theta$. The details of these circuits are not within the scope of this invention and will involve no difficulty for skilled technicians.

The sagnificance of this loop diagram is its confirmation that the properties of the hot-pressed ferroelectric composition identified herein are completely compatible with its application as a multistate memory device. It demonstrates that, for this composition, a given information pulse may be expected to produce a substantially fixed change in incremental polarization under proper switching pulse conditions. While uniform incremental changes in polarization with switching pulses of equal energy are desirable, it will be understood that a nonuniform series of such increments having stability with repeated information switching cycles and with time and temperature variation are acceptable.

It was not suspected prior to the investigations described herein that when certain constraints are placed upon the useful range of polarization of a ferroelectric ceramic and upon the frequency of an interrogating signal, that the 2-terminal small signal immittance of a disk or bar resonator constructed of such material becomes a smooth monotonic function of remanent polarization. This relationship is demonstrated by reference to FIG. 3, which is an admittance locus plot for the PZT 65/35 composition hot pressed and containing 2-atom percent bismuth and formed into a 2-terminal disk resonator in the radial resonant mode. The horizontal axis G represents conductance and the vertical axis B denotes susceptance. A small signal of varying frequency is applied for each incremental state of polarization in the hysteresis loop of FIG. 2 beginning with saturation remanence $P_R=1.0$.

When the frequency of the interrogating signal is varied within the general vicinity of the radial resonant mode of the resonator, an approximately circular plot is generated by the rotation of radially extending admittance vector $|Y|$. In each case the signal frequency passes through a value $f_S$, denoting a condition of series resonance for the ceramic element. This relation may be expressed as follows:

$$Y=G+j\omega C$$

where:

$Y$=admittance vector
$G$=conductance
$j\omega C$=susceptance

Figure 3:
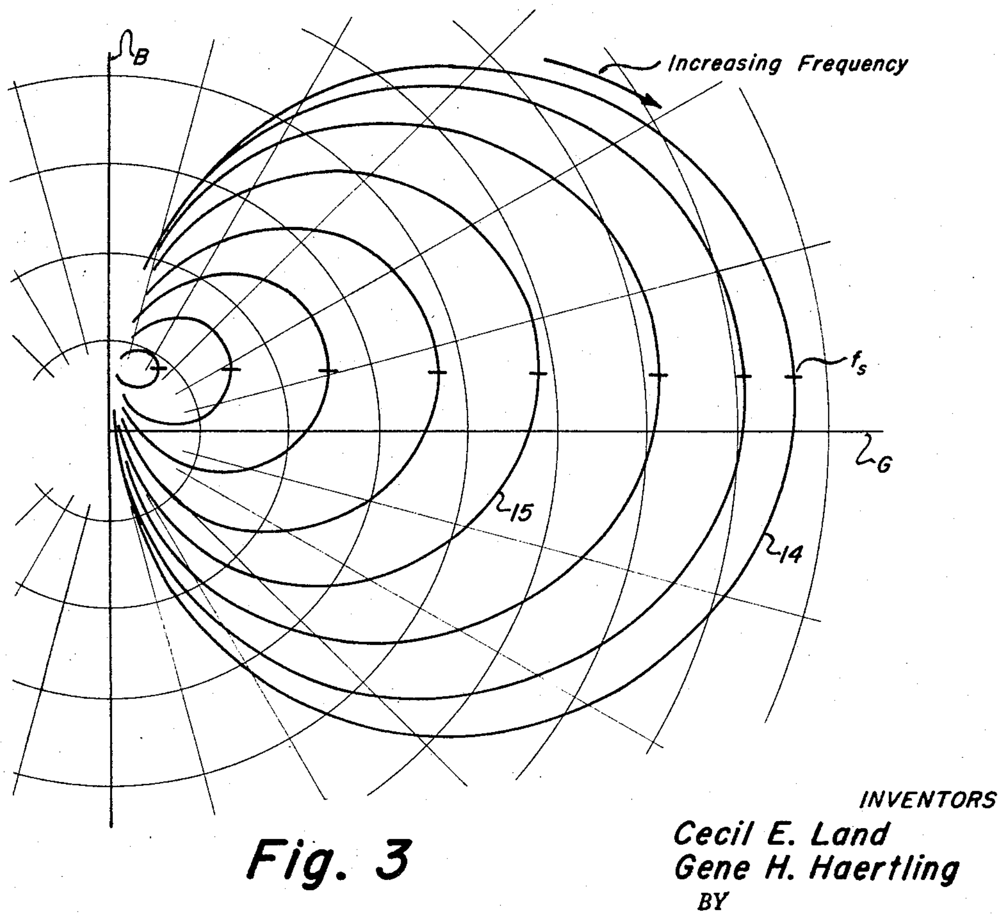
FIG. 3 is an admittance locus plot for a ferroelectric ceramic composition of this invention illustrating successive incremental polarization states.

Beginning with the ceramic element in a condition of saturation remanence, locus plot 14 is generated. For successive values of $P_1$ on the hyteresis loop the same range of frequencies of the interrogating signal are applied to generate successive admittance plots of uniformly decreasing radius. For example, plot 15 is calculated for a condition of polarization $P_1$ obtained by switching through cycles 10, 11 and 12, FIG. 2. In like manner the entire array of FIG. 3 is generated. It will be appreciated from FIG. 3 that the admittance of the disk resonator is a maximum at saturation ramanence and decreases steadily as successive incremental polarization states between saturation remanence and zero are assumed. This illustrates the continuous monotonic relationship which exists between immittance and polarization without which a ferroelectric ceramic would be unusable as a multistate memory element. It is found, in addition, that for compositions such as that under discussion, this admittance locus plot is substantially invariant for successive information storage cycles within a tolerance of 0.1%. This invariance is another material characteristic which is basic to the operation of a ferroelectric memory device. It is discovered by way of comparison that for ferroelectric compositions not comprehended within the scope of this invention, this necessary invariance does not exist, the variance frequently ranging as high as 10%.

Investigation of the general series of compositions described above using disk resonators of various physical sizes was conducted to determine whether significant changes occurred in the stability of incremental polarization states with time and temperature since the stability of these states is a limiting factor in determining the maximum number of storage states per storage element regardless of the type of readout system employed. In a particular experiment relative polarization as a function of time over a period of one minute varied so minutely that such variations could not be detected using an electrometer amplifier and a 4-digit voltmeter. A further experiment revealed the variation of relative polarization with temperature over a range of 0° C. to 140° C., far less than the variation of magnetization which is presently achievable with ferrite memories. It is found that the temperature sensitivity can be further reduced by annealing the material in an oxygen atmosphere at 900° C. for several hours and this annealing further improves the rectangularity of the hysteresis loop.

It should be understood that the ferroelectric ceramic compositions of this invention can be used if desirable as simply a 2-element bar or disk resonator with improved results over those obtainable with prior art compositions. Further they may be used as new and novel biremanence devices, which is a natural outgrowth of their multistate capability. As such a biremanence the element may use as storage states one polarization value near saturation remanence and a second value intermediate the first and zero polarization. Since both of these remanence values are of the same polarity with respect to zero polarization, readout of state is effected by comparison of the amplitude of input and output signals. The advantage of this device over conventional biremanent ferroelectric elements is that the switching involves only a small portion of the hysteresis loop, hence such switching is faster and requires less energy. Also, the lifetime of the memory element should be increased since switching strains are minimized. Readout is no more complicated since amplitude detection is less difficult than phase detection, especially when only two different levels are involved.

Obviously a multiremanence device using its full capabilities as a 2-terminal disk or bar resonator would at once enhance the versatility of the system in which it was incorporated making it possible, for example, to avoid a binary to decimal conversion. In addition it may be observed that an array of separate 2-terminal resonators on a single ceramic sheet could be formed by an arrangement of small electroded areas to permit independent switching of said resonators either as biremanent or multiremanent devices. For a 2-terminal resonator in accordance with this invention ten storage states are readily achievable with the use of the new compositions as described herein.

Figure 4:
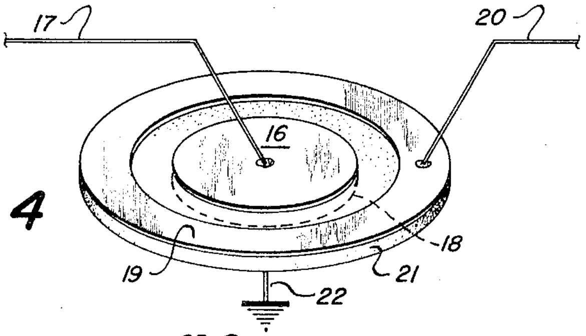
FIG. 4 is a perspective elevational view of a 3-terminal ferroelectric memory element, together with FIG. 4*a* constituting an approximate lumped parameter, small-signal equivalent circuit for said element.

The simplest configuration of a multiterminal memory element with transmission-type readout for which the multiremanent ferroelectric compositions of this invention may be employed is illustrated in FIG. 4. The ceramic in the area of the center electrode 16 positioned on the upper surface in the drawing is polarized at saturation remanence resulting in maximum planar electromechanical coupling coefficient in that area. The interrogation signal 17 is converted to a radial elastic vibration by virtue of the planar piezoelectric coupling to the portion of ceramic material 18 under center electrode 16. This elastic wave travels radially outward toward the periphery of the disk and is there reconverted to an electrical signal appearing at ring electrode 19. The amplitude and phase of output signal 20 is a function of the planar coupling coefficient of the ceramic portion 21 under the ring electrode 19. This coupling coefficient and therefore the output signal 20 are functions of the particular incremental state of polarization in the region of ring electrode 19. A suitable ground 22 may be connected to an electrode co-extensive with the under surface of the disk (not seen). For a plurality of differing incremental polarization states associated with ring electrode 19, a like number of differing output signals 20 can be obtained for the same input signal 17.

Figure 4A:
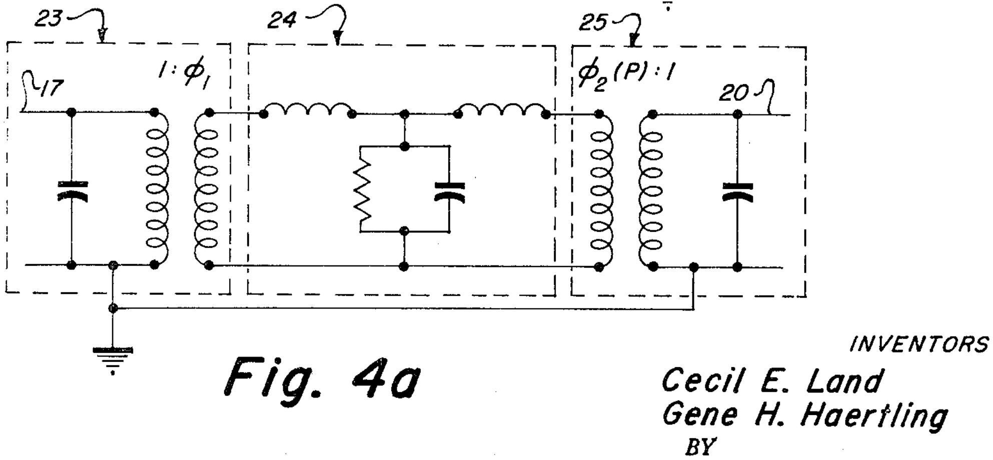

An approximate lumped parameter small-signal equivalent circuit of the 3-terminal memory element of FIG. 4 is shown in FIG. 4*a*. The dashed line area 23 is the equivalent of the input 17 to center electrode 16 wherein the electromechanical energy conversion is symbolized by the transformer ratio $1:\phi_1$. The second dashed line area 24 represents an elastic transmission line whereby the elastic vibration wave is transmitted radially toward the disk periphery. Finally, dashed line area 25 denotes the electromechanical reconversion at ring electrode 19 connected to output 20, the conversion being dependent upon the ratio $\phi_2(P):1$, where $\phi_2(P)$ is a function of the polarization state which exists in the ferroelectric element. Here again it now becomes apparent that the presence of an element with multiremanent states greatly enlarges the range of utility of this logic circuit building block. For example, we may write in any one of ten information (polarization) states in portion 21 of the ceramic under ring 19 and thereby provide any one of ten different values of output signal 20 for a given input 17.

It is important at this stage to note that more sophisticated versions of multiterminal memory devices may easily be constructed to operate in substantially the same fashion as the element of FIG. 4. In general the pattern of a center electrode surrounded by a plurality of peripheral electroded areas can be followed. It may also be noted that there is no inherent limitation to a flat disk-shaped element, any desired thin lamina of ferroelectric ceramic in accordance with the invention being easily adaptable to use as a memory device. For multiterminal transmission line applications of the present invention, twenty storage states per element are readily achievable.

Practical limitations in the number of incremental polarization states achievable by employing ferroelectric ceramics as herein defined to function as memory elements include primarily the stability of the remanent polarization states. While there is a certain tolerable variation in these states compatible with successful operation of a type of readout circuitry of given sensitivity, the number of states required for a given memory element must preserve a separation which takes this tolerance into consideration.

It is also true that relatively fast switching signals will in general be preferable. The stability of the polarization states as a function of time is observed to be considerably better when the switching is accomplished using fast pulses. Switching time for a fixed increment of polarization depends upon the pulse source, impedance, pulse amplitude and duration, and the switching impedance of the device. It also decreases with the size of the element. For example, switching times of 100 nanoseconds are easily achievable with memory elements in accordance with the invention 0.02 inch diameter and 0.005 inch thickness.

It may be observed further that the effective height of the hysteresis loop in terms of remanent polarization is a function of the cross-sectional area of a disk resonator. Increasing this area will permit a greater number of incremental polarization states.

To sum up briefly, what has been achieved is the development of a new ferroelectric ceramic composition with the hitherto unavailable capability of storing information in a large indeterminate number of fixed stable polarization states uniquely adapted to be efficiently, continuously, and nondestructively interrogated when employed as a practical memory element. An appreciation of the single valued monotonic immittance-polarization relationship which is found to exist for differing states of polarization within ferroelectric materials is fundamental to the new concept and its reduction to practice.

It is obvious that a composition of ferroelectric ceramic in accordance with this invention has inherently variable reactance capability. As such, it will find application in mechanical filters incorporating electrically variable reactances, ceramic transformers with variable voltage transformation ratios, FM discriminators incorporating electrically variable reactances, and variable frequency oscillators operating on either the series resonance or the parallel resonance characteristics of the multiremanent ferroelectric material.

The specific embodiments of the present invention described in this specification are to be understood as illustrative only. It will be obvious to those skilled in the art that various changes and modifications may be made therein without departing from the invention as set forth above and as defined in the claims appended hereto.

What is claimed is:

1. A new and improved single phase rhombohedral ferroelectric ceramic composition having a plurality of stable, repeatable and detectable polarization states above zero polarization, consisting essentially of a solid solution of lead zirconate and lead titanate in which the lead zirconate is present in the proportion of 65 mol percent and the lead titanate in the proportion of 35 mol percent, said composition also including 2-atom percent of bismuth as $Bi_2O_3$, said composition being formed by hot pressing at a temperature greater than 1250 and less than 1350° C. at a pressure of at least 1500 lbs./sq. in. for a time of at least one hour.

2. A new and improved single phase rhombohedral ferroelectric ceramic composition having a plurality of stable, repeatable and detectable polarization states above zero polarization, consisting essentially of a solid solution of lead zirconate and lead titanate in which the lead zirconate is present in the proportion of greater than 60 and less than 80 mol percent, said composition also including 2-atom percent of bismuth as $Bi_2O_3$, said composition being formed by hot pressing at a temperature greater than 1250 and less than 1350° C. at a pressure of at least 1500 lbs./sq. in. for a time of at least one hour.

3. A new and improved single phase rhombohedral ferroelectric ceramic composition having a plurality of stable, repeatable and detectable polarization states above zero polarization, consisting essentially of a solid solution of lead zirconate and lead titanate in which the lead zirconate is present in the proportion of 65 mol percent, said composition also including from .1 to 4-atom percent of an element in oxidic form selected from the group consisting of niobium, tantalum, bismuth, and antimony, said composition being formed by hot pressing at a temperature greater than 1250 and less than 1350° C. at a pressure of at least 1500 lbs./sq. in. for a time of at least one hour.

4. A new and improved single phase rhombohedral ferroelectric ceramic composition having a plurality of stable, repeatable and detectable polarization values above zero polarization, consisting essentially of a solid solution of lead zirconate and lead titanate in which the lead zirconate is present in the proportion of greater than 60 and less than 80 mol percent, said composition also including from .1 to 4-atom percent of an element in oxidic form selected from the group consisting of niobium, tantalum, bismuth, and antimony, said composition being formed by hot pressing at a temperature greater than 1250 and less than 1350° C. at a pressure of at least 1500 lbs./sq. in. for a time of at least one hour.

5. A new and improved ferroelectric ceramic composition as in claim 4 wherein said composition after being hot pressed is annealed at 900° C. in oxygen atmosphere for one hour.

6. A multiremanence memory element comprising a 2-termnial resonator constructed of a single phase rhombohedral ferroelectric ceramic material formed by hot pressing at a temperature greater than 1250 and less than 1350° C. at a pressure of at least 1500 lbs./sq. in. for a time of at least one hour having essentially the constituency indicated by the formula:

$$Pb_{.99}Bi_{.02}(Zr_{.65}Ti_{.35})_{.98}O_3$$

7. A method of forming a single phase rhombohedral ferroelectric ceramic composition having a plurality of stable, repeatable and detectable polarization states above zero polarization, comprising mixing to a homogeneous blend materials having essentially the following percentages by weight: lead oxide (PbO) 66.65%, zirconium oxide ($ZrO_2$) 23.67%, titanium oxide ($TiO_2$) 8.27%, bismuth oxide ($Bi_2O_3$) 1.41%, calcining the resulting blend at temperatures of at least 900° C. for approximately one hour, and hot pressing said composition at a temperature greater than 1250 and less than 1350° C. at a pressure of at least 1500 lbs./sq. in. for a time of at least one hour.

8. A method of forming a ferroelectric ceramic composition in accordance with claim 7 wherein after hot pressing, said composition is annealed at 900° C. in oxygen atmosphere for one hour.

References Cited

UNITED STATES PATENTS

| | | | |
|---|---|---|---|
| 2,563,307 | 8/1951 | Burnham et al. | 106—39 |
| 2,915,407 | 12/1959 | Gulton | 106—39 |
| 2,956,327 | 10/1960 | Borel et al. | 252—62.9 X |
| 3,068,177 | 12/1962 | Sugden | 252—62.9 |
| 3,117,094 | 1/1964 | Roup et al. | 252—62.9 |

HELEN M. McCARTHY, *Primary Examiner.*

W. R. SATTERFIELD, *Assistant Examiner.*

U.S. Cl. X.R.

106—39; 252—62.9, 63.5